United States Patent [19]

Nagatoshi et al.

[11] 4,181,689

[45] Jan. 1, 1980

[54] RESIN COMPOSITIONS CONTAINING MODIFIED POLYPROPYLENE

[75] Inventors: Kikuo Nagatoshi, Kisarazu; Toshimichi Ito, Sodegaura; Akio Inayoshi, Sodegaura; Atsunobu Sakoda, Sodegaura; Noriki Fujimoto, Sodegaura; Hidehiko Kaji, Sodegaura; Hirozo Sugahana, Sodegaura all of Japan

[73] Assignee: Idemitsu Kosan Company, Ltd., Tokyo, Japan

[21] Appl. No.: 951,364

[22] Filed: Oct. 16, 1978

Related U.S. Application Data

[63] Continuation of Ser. No. 782,018, Mar. 28, 1977, abandoned.

[30] Foreign Application Priority Data

Sep. 14, 1976 [JP] Japan ................................ 51-109461

[51] Int. Cl.$^2$ ........................................... C08F 255/02
[52] U.S. Cl. .................................................. 525/419
[58] Field of Search ............ 260/876 R, 878 R, 42.46, 260/42.47

[56] References Cited

U.S. PATENT DOCUMENTS

| | | | |
|---|---|---|---|
| 3,131,990 | 5/1964 | Bonvicini | 260/878 R |
| 3,856,889 | 12/1974 | McConnell | 260/876 R |
| 3,862,266 | 1/1975 | McConnell | 260/878 R |
| 3,998,909 | 12/1976 | Roberts | 260/878 R |
| 4,000,111 | 12/1976 | Henman | 260/878 R |

*Primary Examiner*—Paul R. Michl
*Attorney, Agent, or Firm*—Frishauf, Holtz, Goodman & Woodward

[57] ABSTRACT

A resin composition comprising a modified polypropylene obtained by reacting a polypropylene with a liquid rubber and maleic anhydride in a solvent in the presence of a radical generator, another polyolefin and, if desired, an inorganic and/or an organic filler.

The resin composition has excellent coating, adhesion and plating properties.

10 Claims, No Drawings

RESIN COMPOSITIONS CONTAINING MODIFIED POLYPROPYLENE

This is a continuation, of application Ser. No. 782,018, filed Mar. 28, 1977 now abandoned.

BACKGROUND OF THE INVENTION

1. Field of the Invention

The present invention relates to a resin composition containing a modified polypropylene. More particularly, the present invention is concerned with a resin composition containing a modified polypropylene obtained by reacting a polypropylene with a liquid rubber and maleic anhydride.

2. Description of the Prior Art

In general, non-polar plastics such as polyethylene and polypropylene have poor dyeability, ink receptivity, plating and coating properties and adhesion characteristics owing to the low affinity thereof, although they are chemically stable. It is quite difficult to process the non-polar plastics to apply a coating printing, etc.

In order to improve these properties of the plastics, incorporation of inorganic fillers in the plastics; physical or chemical treatments of plastic articles, e.g., surface treatments such as chemical etching, corona discharge treatment, flame treatment, plasma jet treatment, etc.; surface-coarsening using sandpaper, etc., and application of primers, etc., have heretofore been conducted.

These techniques, however, the disadvantages in that expensive apparatus and complicated operations are needed, the plastic articles to be treated are limited in their shapes and sizes, care must be taken in handling the already molded plastic articles, and it is difficult to effect a uniform treatment.

On the other hand, a method of introducing polar groups into polypropylene resins by reacting them with maleic anhydride, for example, to improve their adhesion characteristics and dyeability thereof is described in Japanese Patent Publications Nos. 27421/1968 and 15422/1969. This method, however, has failed to sufficiently achieve the expected results since it is difficult to introduce a large amount of the polar groups.

SUMMARY OF THE INVENTION

An object of the present invention is to provide a resin composition with which it is possible to produce an article having excellent adhesion and plating characteristics without applying any conventional complicated treatment on the surface of the article.

A further object of the present invention is to provide a resin composition with which it is possible to produce an article having excellent ink receptivity and coating properties without applying any treatment such as a surface-treatment to the article.

It has now been found that a modified polypropylene can be obtained by reacting a polypropylene with a liquid rubber and maleic anhydride in a solvent in the presence of a radical generator; that is, a modified polypropylene containing an effective amount of polar groups can be obtained by reacting a polypropylene with a liquid rubber and maleic anhydride. Objects of the present invention are attained by using this modified polypropylene as an essential component of the resin compositions.

Thus, the present invention provides a resin composition comprised of at least 10 percent by weight of a modified polypropylene containing an additional amount of maleic anhydride of from 1 to 10 percent by weight, which is produced by the above method, a polyolefin and, if necessary, inorganic and/or organic filler.

DETAILED DESCRIPTION OF THE INVENTION

A modified polypropylene which is used as an essential component of the present invention is produced by reacting a polypropylene with a liquid rubber and maleic anhydride in a solvent and in the presence of a radical generator.

There is no limitation to the polypropylene used in producing the modified polypropylene. Isotactic polypropylene, atactic polypropylene produced in stereoregulated polymerization, and those polypropylenes obtained by copolymerizing propylene with a small amount of another olefin are generally called polypropylene resins, and can be so used.

The term "liquid rubber" as herein used designates polymers composed mainly of diene monomers and having a number average molecular weight of from 500 to 10,000. Preferred polymers are those showing fluidity at room temperature (about 20° C.).

Suitable examples of these liquid rubbers include poly-1,2-butadiene, poly-1,4-butadiene, polyisoprene, polychloroprene, styrene-butadiene copolymers, acrylonitrile-butadiene copolymers, butadiene-isoprene copolymers, and butadiene-pentadiene copolymers; such polymers or copolymers containing functional groups such as carboxyl, hydroxyl, mercapto, halogen, amino, aziridino and epoxy; unsaturated dicarboxylic acid half-esters of poly-1,2-butadiene and poly-1,4-butadiene, each being hydroxylated at the terminal carbon; heat-decomposed rubber and ozone-decomposed rubber; and mixtures thereof.

The liquid rubber is preferably used in an amount of from 1.0 to 20 parts by weight per 100 parts by weight of the polypropylene. When the amount of the liquid rubber added is less than 1.0 part by weight, only a minor effect is obtained; whereas, in the case of more than 20 parts by weight, undesirable gelation of the liquid rubber is predominant. The liquid rubber contributes by introducing a large amount of maleic anhydride from the standpoint of elementary reaction, and it also acts to improve the physical properties such as strength, ink receptivity, adhesion, coating, plating, etc., of the modified polypropylene.

Maleic anhydride is generally used in an amount of from 5 to 50 parts by weight per 100 parts by weight of the polypropylene. When the amount of the maleic anhydride used is less than 5 parts by weight per 100 parts by weight of the polypropylene, the dyeability, adhesion characteristics and ink receptivity of articles produced are insufficiently improved; whereas, the use of more than 50 parts by weight of the maleic anhydride is meaningless as no effect corresponding to the amount is obtained.

Any radical generator can be used provided that it accelerates the reaction of the polypropylene with the liquid rubber and maleic anhydride. Suitable examples of these radical generators are benzoyl peroxide, lauroyl peroxide, azobisisobutylonitrile, dicumyl peroxide, $\alpha,\alpha'$-bis(t-butylperoxydiisopropyl)benzene, 2,5-dimethyl-2,5-di(ti-butylperoxy)hexane, di-t-butyl peroxide, cumene hydroperoxide and t-butyl hydroperoxide.

A suitable radical generator is selected depending upon the solvent used. It is effective to use the radical generator in an amount of from 0.5 to 10 parts by weight per 100 parts by weight of the polypropylene. The addition of more than 10 parts by weight of the radical generator gives no greater effect.

Solvents used in reacting the above polypropylene, liquid rubber, maleic anhydride and radical generator can vary, provided that they are able to swell or dissolve the polypropylene. For example, hydrocarbons such as xylene, toluene, tetralin, decalin, heptane and the like, or halogenated hydrocarbons such as monochlorobenzene, dichlorobenzene and the like can be used. Among these solvents, a xylene is preferred. The amount of the solvent employed can be varied within wide limits provided that the effect of the solvent is attained. It is preferred, however, taking into account economy and convenience of operation, that the amount is in the range of from 500 to 1,000 parts by weight per 100 parts by weight of the polypropylene.

The reaction temperature and time will vary depending upon the kinds of radical generator and solvent used, and the concentrations of starting materials. The reaction temperature is generally from 50° to 150° C., and the reaction time is suitably from 2 to 5 hours. The most suitable conditions for a reaction system comprising isotactic polypropylene, dicumyl peroxide and a xylene are from 120° to 140° C. and from 3 to 4 hours.

Isolation of the modified polypropylene obtained can be carried out by conventional methods; for instance, the modified polypropylene obtained is cooled, precipitated in a poor solvent such as acetone, filtered with suction, and dried in a vacuum.

The amount of maleic anhydride incorporated in the modified polypropylene as described above is generally from 1 to 10 percent by weight based on the total weight of the modified polypropylene, and under preferred conditions is from 3 to 8 percent by weight. When the amount is below 1 percent by weight, the resin composition exhibits insufficient affinity, resulting in low adhesion printing, coating and plating characteristics. On the other hand, although it is possible to introduce more than 10 percent by weight of maleic anhydride by using a liquid rubber in an amount of more than 20 parts by weight, no effect corresponding to the additional amount is obtained and operations are complicated, which are disadvantageous even from the economic standpoint.

The method of the present invention, in which the reaction is carried out in the presence of a liquid rubber, makes it possible to produce a modified polypropylene with a larger amount of maleic anhydride incorporated therein than in conventional ones. The modified polypropylene obtained is more improved in physical properties in comparison with conventional polypropylene resins, and furthermore, it has excellent dyeability and excellent fabricating characteristics such as adhesion characteristics to various kinds of materials, ink receptivity, coating, plating, etc. Thus, the modified polypropylene of the present invention can be effectively used in producing fiber or plastic molds, particularly molds suitable for coating and plating, and furthermore, it can be used widely in many industrial applications, e.g., as a blending material for modifying other plastics, coating of inorganic materials, etc.

Next, a resin composition capable of providing articles having improved adhesion characteristics is described.

This resin composition comprises at least 10 percent by weight of a modified polypropylene containing 1 to 10 percent by weight of maleic anhydride, which is produced by the method described above. This resin composition comprises, in general, the modified polypropylene and another olefin resin, although it may be composed of the modified polypropylene alone.

Polyolefin resins which can be used in combination with the modified polypropylene include polyethylene and polypropylene. Of these polyolefin resins, polypropylene is most preferably used. As this polypropylene, stereospecific polypropylene, modified stereospecific polypropylene prepared by blending with atactic polypropylene and/or low density polyethylene, modified stereospecific polypropylene prepared by blending with a small amount of another resin, modified polypropylene prepared by copolymerizing with a small amount of another olefin and the like can be used. Further, a thermoplastic resin such as ABS resin, polystyrene, nylon, etc., can also be used.

The resin composition of the present invention is prepared by mixing or compounding the above modified polypropylene and another polyolefin resin, if required, followed by sufficient kneading thereof. In this case, the modified polypropylene is blended so that its content is at least 10 percent by weight, preferably at least 20 percent by weight, based upon the total weight of the resin composition. In more detail, a resin composition of the present invention is prepared by blending from 100 to 10 percent by weight, preferably 95 to 10 percent by weight and more preferably 90 to 20 percent by weight, of the modified polypropylene, and from 0 to 90 percent by weight, preferably 5 to 90 percent by weight and most preferably 10 to 80 percent by weight of another polyolefin resin such as polyethylene, polypropylene, etc.

Where the content of the modified polypropylene is below 10 percent by weight, adhesion, printing, coating and plating characteristics are not improved sufficiently, and the object of the present invention is not attained.

The resin composition of the present invention also provides articles having excellent adhesion characteristics, ink receptivity, coating and plating properties in comparison with related articles obtained from conventional polyolefin resins. Thus, it is possible to adhere the new articles to metal, various plastics and other materials with ease and sufficient strength. For instance, laminated films, laminated (multilayer) bottles, etc., produced from the resin compositions of the present invention can be utilized suitably as wrapping materials, bottles for liquids, etc. In addition, coating of a metal surface with the resin composition of the present invention effectively prevents corrosion of the metal.

As described above, the resin composition of the present invention is useful for providing articles having excellent ink receptivity, coating, plating and adhesion properties. When utilizing the resin composition for such uses, a resin composition which is comprised of from 10 to 80 parts by weight of a modified polypropylene having a maleic anhydride content of from 1 to 10 percent by weight, and from 90 to 20 parts by weight of a polyolefin resin is preferable. A resin composition comprising from 30 to 70 parts by weight of a polyolefin resin and from 70 to 30 parts by weight of the modified polypropylene provides superior ink receptivity, coating, plating and adhesion properties. When a lower amount of the modified polypropylene is present, the resin's affinity to ink or paint is insufficient. When a greater amount of the modified polypropylene is present, no effect corresponding to the additional amount is obtained, and economic disadvantages result.

Furthermore, incorporation of a filler into the mixture of the polyolefin resin and the modified polypropylene increases its characteristics such as excellent ink receptivity and coating properties, and provides a resin composition having excellent mechanical strength.

Fillers as blended herein include inorganic and/or organic fillers. These fillers increase the strength and suitably coarsen the surface of an article, thereby increasing its affinity to paint, i.e., exhibit the so-called anchor effect. The above effects can be attained with a small amount of coarse filler particles. From this point of view, the amount of inorganic filler blended is preferably from 10 to 80 percent by weight based upon the total weight of the resin composition and is most suitably from 20 to 60 percent by weight.

On the other hand, with an organic filler the amount blended is preferably from 1 to 50 percent by weight and most suitably from 5 to 40 percent by weight, based upon the total weight of the resin composition. When the filler is added in an excess, kneading and molding become difficult, and at the same time, the surface of the article is coarsened excessively, resulting in a nonuniform coating surface.

Preferred examples of inorganic fillers include calcium carbonate, talc, clay, silica, kieselguhr, alumina, zinc white, magnesium oxide, mica, calcium sulfite, calcium sulfate, calcium silicate, glass powder, glass fiber, asbestos and gypsum fiber. Preferred examples of the organic fillers include various kinds of wood powders and cellulose fiber.

Articles produced from the resin compositions of the present invention as described above have excellent ink receptivity, coating and plating properties, etc., and thus a surface treatment after molding is not needed. Moreover, an article produced from the resin composition with a filler incorporated therein has superior ink receptivity and mechanical strength. Coating materials having particularly excellent affinity to the resin composition of the present invention include synthetic coating materials such as epoxy resin based-, melamine-alkyd resin based-, urethane resin based- and like coating materials, and Japanese lacquer. In addition, an oil paint, water paint, cellulose derivative paint and the like can be used.

The resin compositions of the present invention having excellent characteristics can be utilized suitably in producing lacquered ware or industrial parts, particularly parts of light electrical applicances, cars, etc., for which heat-resistance, chemical resistance, etc., are required.

The present invention is illustrated in detail with the following typical examples and comparative examples.

EXAMPLE 1

A mixture of 100 parts by weight of polypropylene containing a copolymer of propylene and a small amount of ethylene (melt index: 9 grams/10 min.; density: 0.91 g/cm$^3$), 5 parts by weight of a terminal-hydroxylated poly-1,2-butadiene (number average molecular weight: 2000; density: 0.88 g/cm$^3$; flow point: 17° C.), 20 parts by weight of maleic anhydride, 1.72 parts by weight of dicumyl peroxide, and 600 parts by weight of xylene were placed in a 1 liter, three-necked separatory flask equipped with a stirrer and a reflux apparatus, heated on an oil bath by the use of an immersion heater. The mixture was stirred at 120° C. for 1 hour, and then at 140° C. for 3 hours. After reaction was completed, the reaction mass was cooled and precipitated in a great excess of acetone. The precipitate was filtered with suction and further dried at 70° C. for 50 hours, whereby a white, powdery polymer was obtained.

The thus-obtained dried product was placed in a Soxhlet extraction apparatus and extracted for 16 hours with acetone to thereby remove unreacted polybutadiene and maleic anhydride. Thereafter, the maleic anhydride content per total weight of the polymer produced was calculated. As a result, the acid value was 55.8; that is, the maleic anhydride content was 4.9 percent by weight.

EXAMPLE 2

The procedure of Example 1 was repeated with the exception that the amount of the terminal-hydroxylated poly-1,2-butadiene was increased to 20 parts by weight.

With the polymer so obtained, the acid value was 89.1; that is, the maleic anhydride content was 7.8 percent by weight.

EXAMPLE 3

The procedure of Example 1 was repeated with the exception that the amount of maleic anhydride was increased to 40 parts by weight.

With the polymer so obtained, the acid value was 67.1; that is, the maleic anhydride content was 5.9 percent by weight.

Comparative Example 1

The procedure of Example 1 was repeated with the exception that the terminal-hydroxylated poly-1,2-butadiene was omitted, and the amount of xylene was increased to 800 parts by weight.

With the polymer so obtained, the acid value was 5.7; that is, the maleic anhydride content was 0.5 percent by weight.

EXAMPLE 4

The procedure of Example 1 was repeated with the exception that the amount of dicumyl peroxide was increased to 3.45 parts by weight.

With the polymer so obtained, the acid value was 58.7; that is, the maleic anhydride content was 5.1 percent by weight.

Comparative Example 2

The procedure of Example 4 was repeated with the exception that the terminal-hydroxylated poly-1,2-butadiene was omitted, and the amount of xylene was increased to 800 parts by weight.

With the polymer so obtained, the acid value was 4.9; that is, the maleic anhydride content was 0.4 percent by weight.

EXAMPLE 5

In the same apparatus as used in Example 1, 100 parts by weight of a polypropylene containing copolymers of propylene and a small amount of ethylene (melt index: 3 grams/10 min.; density: 0.91 g/cm$^3$), 5 parts by weight of a terminal-hydroxylated poly-1,4-butadiene (number average molecular weight: 3,000; viscosity: 50 poise (at 30° C.); OH group content: 0.83 meq./g.), 20 parts by weight of maleic anhydride, 1.72 parts by weight of dicumyl peroxide, and 600 parts by weight of xylene were placed, and thereafter the same procedure as used in Example 1 was conducted.

With the polymer so obtained, the acid value was 59.1; that is, the maleic anhydride content was 5.2 percent by weight.

EXAMPLE 6

In the same apparatus as used in Example 1, 100 parts by weight of a propylene homopolymer (melt index: 9 grams/10 min.; density: 0.91 g/cm$^3$), 5 parts by weight of a terminal-carboxylated poly-1,2-butadiene (number average molecular weight: 2000; density: 0.89 g/cm$^3$; flow point: 20° C.), 20 parts by weight of maleic anhydride, 2.15 parts by weight of α,α'-bis(t-butylperoxydiisopropyl)benzene, and 600 parts by weight of xylene were placed, and thereafter the same procedure as used in Example 1 was conducted.

With the polymer so obtained, the acid value was 53.7; that is, the maleic anhydride content was 4.7 percent by weight.

EXAMPLE 7

In the same apparatus as used in Example 1, 100 parts by weight of a polypropylene containing copolymers of propylene and a small amount of ethylene (melt index: 9 grams/10 min.; density: 0.91 g/cm$^3$), 10 parts by weight of a terminal-hydroxylated poly-1,4-butadiene (number average molecular weight: 3000; viscosity: 50 poise (at 30° C.); OH group content: 0.83 meq./g.), 20 parts by weight of maleic anhydride, 1.72 parts by weight of dicumyl peroxide, and 600 parts by weight of xylene were placed, heated on an oil bath by the use of an immersion heater, reacted with stirring at 120° C. for 1 hour, and further reacted at 140° C. for 3 hours. After the reaction was completed, the reaction mass was cooled and precipitated in a great excess of acetone. The precipitate was filtered with suction and further dried at 70° C. for 50 hours, whereby a white, powdery polymer was obtained.

The thus-obtained dried product was placed in a Soxhlet extraction apparatus and extracted with acetone for 16 hours to thereby remove the unreacted polybutadiene and maleic anhydride. Thereafter, the maleic anhydride content per total weight of the polymer produced was calculated. As a result, the acid value was 66.2; that is, the maleic anhydride content was 5.8 percent by weight.

The thus-obtained modified polypropylene was fed to a vertical type injection molding machine (mold clamping force: 16 tons) and made into a plate (3 millimeters thick, 75 millimeters long, 31 millimeters wide) under the following molding conditions: cylinder temperature, 200° C.; injection pressure, 50 kg/cm$^2$; and mold temperature, room temperature.

Plating on this plate was done with the following process. The plate was pretreated to degrease it, and it was immersed for 15 minutes in a chemical etching solution (70°±5° C.) prepared by adding potassium dichromate (15 grams per liter of aqueous solution) to an aqueous solution of 60 percent (by volume) of sulfuric acid, 10 percent (by volume) of phosphoric acid and 30 percent (by volume) of water. Then, the plate was dipped into a solution of tin dichloride at room temperature for 5 minutes in order to give induction property, followed by an activating treatment by immersing the plate in a solution of palladium chloride at room temperature for 2 minutes.

After chemically applying a nickel plating, the plate was electroplated conventionally with a semi-bright nickel plating, bright nickel plating and chromium plating in this order.

Electroplating thickness of the thus-obtained product was less than about 25μ. Evaluation of the plating on the product was done by judgment of its appearance visually; the scotch peeling test; bending test and boiling test. The boiling test was done by observing the change of the surface of the product after applying 4 cycles of treatment of dipping the product into boiling water for 2 hours and dipping the product into ice water (0° C.) for 20 minutes. The result is shown in Table 1.

Table 1

Appearance: satisfactory
Scotch Peeling*: 100/100
Bending Test: not peeled
Boiling Test: unchanged.

*The test methods used in the examples and comparative examples are as follows: a cellophane tape (produced by Nichiban Co., Ltd.) was stuck to a coating layer and peeled off rapidly in the 45° direction, which was repeated twice. Scotch peeling: the coating layer was scratched with the edge of a blade to such an extent that it reached to the surface of the underlying article, to produce 100 1 millimeter × 1 millimeter squares thereon. The above tape was stuck on the coating layer and peeled off. The mark A of A/100 indicates the number of remaining squares.

EXAMPLE 8

The same procedure as used in Example 7 was carried out except that 50 parts by weight of the modified polypropylene were replaced with polypropylene (melt index: 9 grams/10 min.; density: 0.91 g/cm$^3$). The results are shown in Table 2.

EXAMPLE 9

The same procedure as used in Example 7 was carried out except that 60 parts by weight of the modified polypropylene were replaced with polypropylene (melt index: 9 grams/10 min.; density: 0.91 g/cm$^3$). The results are shown in Table 2.

EXAMPLE 10

The same procedure as described in Example 7 was used with the exception that 70 parts by weight of the modified polypropylene were replaced with polypropylene (melt index: 9 grams/10 min.; density: 0.91 g/cm$^3$). The results are shown in Table 2.

EXAMPLE 11

The same procedure as described in Example 7 was carried out with the exception that 80 parts by weight of the modified polypropylene were replaced with polypropylene (melt index: 9 grams/10 min.; density: 0.91 g/cm$^3$). The results are shown in Table 2.

Table 2

| Example | Appearance of Plating Product | Scotch Peeling | Bending Test | Boiling Test |
|---|---|---|---|---|
| 8 | satisfactory | 100/100 | not peeled | unchanged |
| 9 | " | 100/100 | " | " |
| 10 | " | 100/100 | " | " |
| 11 | " | 95/100 | peeled | " |

EXAMPLE 12

A mixture of 100 parts by weight of polypropylene containing copolymers of propylene and a small amount of ethylene (melt index: 9 grams/10 min.; density: 0.91 g/cm$^3$), 5 parts by weight of a terminal-hydroxylated poly-1,4-butadiene (number average molecular weight: 3000; viscosity: 50 poise (at 30° C.); OH group content: 0.83 meq./g), 20 parts by weight of maleic anhydride, 1.72 parts by weight of dicumyl peroxide, and 600 parts by weight of xylene were placed in a 5 liter, three-necked separatory flask equipped with a stirrer and a reflux apparatus, heated on an oil bath by the use of an immersion heater, reacted with stirring at 120° C. for 1 hour, and further reacted at 140° C. for 3 hours. After the reaction was completed, the reaction mass was cooled and precipitated in a great excess of acetone. The precipitate was filtered with suction and further dried at 70° C. for 50 hours, whereby a white, powdery polymer was obtained.

The thus obtained dried product was placed in a Soxhlet extraction apparatus and extracted for 16 hours with acetone to thereby remove unreacted polybutadiene and maleic anhydride. Thereafter, the maleic anhydride content per total weight of the polymer produced was calculated. The maleic anhydride content was 5.8 percent by weight.

The thus obtained modified polypropylene, in an amount of 50 parts by weight, was mixed with 50 parts by weight of polypropylene (melt index: 9 grams/10 min.; density: 0.91 g/cm$^3$), and the resulting mixture was kneaded in a 40 millimeter extruder. A film of an average thickness of 80$\mu$ was produced by means of a compression molding machine.

On the other hand, a 150$\mu$ thick aluminum plate was degreased by dipping in acetone for several days and dried at room temperature.

The thus obtained film (A) and aluminum plates (B) were laid one upon another in the order of B-A-B to produce a three-layer laminate. This laminate was heated and pressed at an adhesion temperature of 200° C. and pressure of 100 kg/cm$^2$ for about 5 minutes, and then cooled to produce a composite plate.

With this composite plate, T-peeling strength was 19.6 kg/2.5 cm. The T-peeling test was conducted according to ASTM-D1876-72.

For comparison, T-peeling strength was determined with the plates produced from the non-modified polypropylene and from the modified polypropylene. As a result, the former was 0 kg/2.5 cm. and the latter was 9.0 kg/2.5 cm., respectively.

EXAMPLE 13

The procedure of Example 12 was repeated with the exception that the amount of the terminal-hydroxylated poly-1,4-butadiene was increased to 10 parts by weight, whereby a modified polypropylene having a maleic anhydride content of 6.9 percent by weight was obtained.

The thus obtained modified polypropylene in an amount of 40 parts by weight was mixed with 60 parts by weight of the same polypropylene as used in Example 12, and thereafter the same procedure as used in Example 12 was conducted to produce a composite plate of the modified polypropylene and aluminum plates.

With the thus obtained composite plate, T-peeling strength was 9.3 kg/2.5 cm.

Comparative Example 3

From the same polypropylene as used in Example 12 a 80$\mu$ thick film was produced. A composite plate of the film and aluminum plates was produced according to the same method as used in Example 12.

With the thus obtained composite plate, T-peeling strength was 0 kg/2.5 cm.

Comparative Example 4

The procedure of Example 12 was repeated with the exception that the terminal-hydroxylated poly-1,4-butadiene was omitted, whereby a modified polypropylene having a maleic anhydride content of 0.5 percent by weight was obtained.

This modified polypropylene in an amount of 50 parts by weight was mixed with 50 parts by weight of the same polypropylene as used in Example 12. Thereafter, the same method as used in Example 12 was repeated to produce a composite plate of the film produced from the above mixture and aluminum plates.

With the thus obtained composite plate, T-peeling strength was 1.3 kg/2.5 cm.

Comparative Example 5

The modified polypropylene obtained in Example 12, in an amount of 5 parts by weight, was mixed with 95 parts by weight of the same polypropylene as used in Example 12. Thereafter the same method as used in Example 12 was repeated to produce a composite plate of the film produced from the above mixture and aluminum plates.

With the thus obtained composite plate, T-peeling strength was 1.0 kg/2.5 cm.

EXAMPLE 14

The procedure of Example 12 was repeated with the exception that propylene homopolymer (melt index: 8 grams/10 min.; density: 0.91 g/cm$^3$) was used in place of the polypropylene containing copolymers of propylene and ethylene, whereby a modified polypropylene having a maleic anhydride content of 6.3 percent by weight was obtained.

The modified polypropylene so obtained, in an amount of 50 parts by weight, was mixed with 50 parts by weight of the same polypropylene as used in Example 12. Thereafter the same method as used in Example 12 was conducted to produce a composite plate of the film produced from the above mixture and aluminum plates.

With the thus obtained composite plate, T-peeling strength was 8.5 kg/2.5 cm.

EXAMPLE 15

The procedure of Example 12 was repeated with the exception that a terminal-carboxylated poly-1,2-butadiene (number average molecular weight: 2000; density: 0.89 g/cm$^3$; flow point: 20° C.) was used in place of the terminal-hydroxylated poly-1,4-butadiene, whereby a modified polypropylene having a maleic anhydride content of 6.3 percent by weight was obtained.

The modified polypropylene so obtained, in an amount of 50 parts by weight, was mixed with 50 parts by weight of the same polypropylene as used in Example 12. Thereafter the same method as used in Example 12 was conducted to produce a composite plate of a film produced from the above mixture and aluminum plates.

With the thus obtained composite plate, T-peeling strength was 18.4 kg/2.5 cm.

EXAMPLE 16

The modified polypropylene obtained in Example 12, in an amount of 30 parts by weight, was mixed with 70 parts by weight of polyethylene (melt index: 6.0 grams/10 min.; density: 0.970 g/cm³). Thereafter the same method as used in Example 12 was conducted to produce a composite plate of a film produced from the above mixture and aluminum plates.

With the thus obtained composite plate, T-peeling strength was 8.2 kg/2.5 cm.

EXAMPLE 17

A mixture of 100 parts by weight of polypropylene containing copolymers of propylene and a small amount of ethylene (melt index: 9 grams/10 min.; density: 0.91 g/cm³), 5 parts by weight of a terminal-hydroxylated poly-1,4-butadiene (number average molecular weight: 3000; viscosity: 50 poise (at 30° C.), OH group content: 0.83 meq./g.), 20 parts by weight of maleic anhydride, 1.72 parts by weight of dicumyl peroxide, and 600 parts by weight of xylene were placed in a 5 liter, three-necked separatory flask equipped with a stirrer and a reflux apparatus, heated on an oil bath by the use of an immersion heater, reacted with stirring at 120° C. for 1 hour, and further reacted at 140° C. for 3 hours. After the reaction was completed, the reaction mass was cooled and precipitated in a great excess of acetone. The precipitate was filtered with suction and further dried at 70° C. for 50 hours, whereby a white, powdery polymer was obtained.

The thus obtained dried product was placed in a Soxhlet extraction apparatus and extracted for 16 hours with acetone to thereby remove unreacted polybutadiene and maleic anhydride. Thereafter, the maleic anhydride content per the total weight of the polymer produced was calculated. The maleic anhydride content was 5.8 percent by weight.

The modified polypropylene above obtained, in an amount of 40 parts by weight, was mixed with 60 parts by weight of polypropylene (melt index: 9 grams/10 min.; density: 0.91 g/cm³. The same polypropylene was also used in Examples 18, 20, 21, 22, 23 and 24). The resulting mixture was kneaded, and then compression-molded into a plate of 1.5 millimeters thickness.

With this plate, coating tests were conducted. The results obtained are shown in Table 3.

EXAMPLE 18

The same procedure as described in Example 17 was repeated with the exception that the amount of the terminal-hydroxylated poly-1,4-butadiene was reduced to 3 parts by weight, and the amount of maleic anhydride was reduced 20 parts by weight to 10 parts by weight, whereby a modified polypropylene having a maleic anhydride content of 3.0 percent was obtained.

The thus obtained modified polypropylene, in an amount of 40 parts by weight, was mixed with 60 parts by weight of the same polypropylene as used in Example 17. Then the same coating tests as used in Example 17 were carried out. The results are shown in Table 3.

Comparative Example 6

A plate of 1.5 millimeters thickness was obtained from polypropylene alone.

With this plate, coating tests were conducted. The results are shown in Table 3.

Comparative Example 7

The same procedure as Example 17 was repeated with the exception that the terminal-hydroxylated poly-1,4-butadiene was omitted, whereby a modified polypropylene having a maleic anhydride content of 0.5 percent by weight was obtained.

This modified polypropylene, in an amount of 40 parts by weight, was blended with 60 parts by weight of the same polypropylene as used in Example 17. Then, the same coating tests as described in Example 17 were made. The results are shown in Table 3.

Comparative Example 8

Ten parts by weight of the modified polypropylene obtained in Example 17 were mixed with 90 parts by weight of polypropylene used in Example 17. Then, the same coating tests as described in Example 17 were made. The results are shown in Table 3.

EXAMPLE 19

Fifty parts by weight of the modified polyproyplene produced in Example 17 were mixed with 50 parts by weight of polyethylene (melt index: 6.0 grams/10 min.; density: 0.97 g/cm³). Then, the same coating tests as described in Example 17 were made. The results are shown in Table 3.

EXAMPLE 20

The procedure of Example 17 was repeated with the exception that a propylene homopolymer (melt index: 8 grams/10 min.; density: 0.91 g/cm³) was used in place of a polypropylene containing copolymers of propylene and ethylene (melt index: 9 grams/10 min.; density: 0.91 g/cm³), whereby a modified polypropylene having a maleic anhydride content of 6.3 percent by weight was obtained.

The modified polypropylene so obtained, in an amount of 40 parts by weight, was blended with 60 parts by weight of polypropylene (melt index: 9 grams/10 min.; density: 0.91 g/cm³). Then, the same coating tests as described in Example 17 were carried out. The results are shown in Table 3.

EXAMPLE 21

The procedure of Example 17 was repeated with the exception that a mixture of polypropylene (80 parts by weight) and low density polyethylene (melt index: 8 grams/10 min.; density: 0.924 g/cm³) (20 parts by weight) was used in place of polypropylene, whereby a modified polypropylene having a maleic anhydride content of 5.8 percent by weight was obtained.

The modified polypropylene thus obtained, in an amount of 40 parts by weight, was mixed with 60 parts by weight of polypropylene. Then, the same coating tests as described in Example 17 were made. The results are shown in Table 3.

EXAMPLE 22

The procedure of Example 17 was repeated with the exception that a terminal-carboxylated poly-1,2-butadiene (number average molecular weight: 2000; density: 0.89 g/cm³; flow point: 20° C.) was used instead of a terminal-hydroxylated poly-1,4-butadiene, whereby a modified polypropylene having a maleic anhydride content of 6.3 percent by weight was obtained.

The modified polypropylene, in an amount of 40 parts by weight, was mixed with 60 parts by weight of polypropylene of Example 17. Then, the same coating tests as described in Example 17 were carried out. The results are shown in Table 3.

Table 3

| Example | Whole Peeling Test *4 | | | Scotch Peeling Test *4 |
| --- | --- | --- | --- | --- |
| | *1 Uni-ace 100 | *2 IR Cashew | *3 Mela 200 | IR Cashew |
| 17 | o | o | o | 100/100 |
| 18 | o | o | o | 100/100 |
| 6* | x | x | x | 0/100 |
| 7* | x | x | x | 0/100 |
| 8* | x | x | x | 0/100 |
| 19 | o | o | o | 100/100 |
| 20 | o | o | o | 100/100 |
| 21 | o | o | o | 100/100 |
| 22 | o | o | o | 100/100 |

*Comparative Example
*1 Urethane resin paint produced by Cashew Co., Ltd.
*2 Epoxy resin paint produced by Cashew Co., Ltd.
*3 Melamine-alkyd resin paint produced by Cashew Co., Ltd.
*4 The test methods used in the examples and comparative examples are as follows: a cellophane tape (produced by Nichiban Co., Ltd.) was stuck to a coating layer and peeled off rapidly in the 45° direction, which was repeated twice.
Whole peeling: the above tape was stuck on a coating layer and peeled off. The mark o indicates that no peeling resulted. The mark x indicates that the entire coating layer peeled off.
Scotch peeling: the coating layer was scratched with the edge of a blade to such an extent that it reached to the surface of the underlying article, to produce 100 1 millimeter × 1 millimeter squares thereon. The above tape was stuck on the coating layer and peeled off. The mark A of A/100 indicates the number of remaining squares.

EXAMPLE 23

The modified polypropylene obtained in Example 17, in an amount of 30 parts by weight, and 70 parts by weight of polypropylene were kneaded in a laboplasto mill, and then compression-molded into a 1.5 millimeter thick plate.

With this plate, various tests were conducted. The results obtained are shown in Table 4.

EXAMPLE 24

The modified polypropylene obtained in Example 17, in an amount of 30 parts by weight, 70 parts by weight of polypropylene, and 80 parts by weight of talc (average particle size: 6.5μ) were kneaded in a laboplasto mill, and then compression-molded into a 1.5 millimeter thick plate. Test results with this place are shown in Table 4.

Comparative Example 9

The modified polypropylene obtained in Comparative Example 7 (maleic anhydride content: 0.5 percent by weight), in an amount of 30 parts by weight, was used. In the same manner as in Example 24, a plate was produced. Test results with this plate are shown in Table 4.

EXAMPLE 25

As a filler, 80 parts by weight of calcium sulfite were used, and in the same manner as in Example 24, a plate was produced. Test results with this plate are shown in Table 4.

EXAMPLE 26

As a filler, 30 parts by weight of 120 to 150 mesh powdery wood were used, and in the same manner as in Example 24, a plate was produced. Test results with this plate are shown in Table 4.

EXAMPLE 27

As fillers, 10 parts by weight of 150 to 200 mesh powdery wood and 50 parts by weight of heavy-duty calcium carbonate (average particle size: 1.8μ) were used, and in the same manner as in Example 24, a plate was produced. Test results with this plate are shown in Table 4.

Comparative Example 10

The modified polypropylene obtained in Example 17, in an amount of 10 parts by weight, 90 parts by weight of polypropylene (melt index: 9 grams/10 min.; density: 0.91 g/cm$^3$), and 30 parts by weight of 120 to 150 mesh of powdery wood were used. In the same manner as in Example 24, a plate was produced. Test results with this plate are shown in Table 4.

Table 4

| | Coating Test *1 | | Strength Test | |
| --- | --- | --- | --- | --- |
| | Whole Peeling | Scotch Peeling | Tensile Strength (kg/cm$^2$) | Bending Strength (kg/cm$^2$) |
| Example 23 | o | 100/100 | 305 | 338 |
| Example 24 | o | 100/100 | 343 | 472 |
| Comparative Example 9 | x | 0/100 | 281 | 412 |
| Example 25 | o | 100/100 | 342 | 480 |
| Example 26 | o | 100/100 | 308 | 402 |
| Example 27 | o | 100/100 | 324 | 450 |
| Comparative Example 10 | x | 0/100 | 270 | 381 |

*1: IR Cashew was used.

What is claimed is:

1. Polyolefin resin composition comprising a polyolefin resin and a modified polypropylene obtained by reacting a polypropylene with a liquid rubber and maleic anhydride in a solvent in the presence of a radical generator.

2. Polyolefin resin composition according to claim 1, wherein the amount of polyolefin resin is from about 10 to about 90 percent by weight and the amount of modified polypropylene is from about 90 to about 10 percent by weight.

3. Polyolefin resin composition according to claim 1, wherein the modified polypropylene is a modified polypropylene produced by reacting 100 parts by weight of a polypropylene with from 1 to 20 parts by weight of a liquid rubber and from 5 to 50 parts by weight of maleic anhydride in from 500 to 1,000 parts by weight of a solvent in the presence of from 0.5 to 10 parts by weight of a radical generator.

4. Polyolefin resin composition according to claim 1, wherein the modified polypropylene has a maleic anhydride content of from 1 to 10 percent by weight.

5. Polyolefin resin composition according to claim 1, wherein the polyolefin resin is polyethylene or polypropylene.

6. Polyolefin resin composition according to claim 1, wherein the liquid rubber has a number average molecular weight of from 500 to 10,000.

7. Polyolefin resin composition which comprises a polyolefin resin, a modified polypropylene obtained by reacting a polypropylene with a liquid rubber and maleic anhydride in a solvent in the presence of a radical generator and at least one of an inorganic filler and organic filler.

8. Polyolefin resin composition according to claim 7, wherein the amount of inorganic filler is from 20 to 60 percent by weight based upon the total weight of the composition.

9. Polyolefin resin composition according to claim 7, wherein the amount of organic filler from 1 to 50 percent by weight based upon the total weight of the composition.

10. Polyolefin resin composition according to claim 7, wherein the liquid rubber has a number average molecular weight of from 500 to 10,000.

* * * * *